US010505747B2

(12) United States Patent
Pope et al.

(10) Patent No.: US 10,505,747 B2
(45) Date of Patent: Dec. 10, 2019

(54) FEED PROCESSING

(71) Applicant: SOLARFLARE COMMUNICATIONS, INC., Irvine, CA (US)

(72) Inventors: Steve L. Pope, Costa Mesa, CA (US); David J. Riddoch, Fenstanton (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 439 days.

(21) Appl. No.: 13/789,353

(22) Filed: Mar. 7, 2013

(65) Prior Publication Data

US 2014/0105208 A1  Apr. 17, 2014

Related U.S. Application Data

(60) Provisional application No. 61/714,405, filed on Oct. 16, 2012.

(51) Int. Cl.
*H04L 12/18* (2006.01)
*H04L 12/861* (2013.01)
*G06F 13/38* (2006.01)

(52) U.S. Cl.
CPC ........ *H04L 12/1804* (2013.01); *G06F 13/385* (2013.01); *H04L 49/90* (2013.01);
(Continued)

(58) Field of Classification Search
CPC ... H04L 12/1804; H04L 49/90; G06F 13/385; G06F 2213/0058; G06F 2213/3808
See application file for complete search history.

(56) References Cited

U.S. PATENT DOCUMENTS 4,905,234 A    2/1990   Childress et al.
5,272,599 A   12/1993   Koenen
(Continued)

FOREIGN PATENT DOCUMENTS

EP      620521 A2   10/1994
EP     2463782 A2    6/2012
(Continued)

OTHER PUBLICATIONS

EP 13187725.0—1953—Extended European Search Report dated Feb. 19, 2014, (6 pages).
(Continued)

*Primary Examiner* — Walter J Divito
*Assistant Examiner* — Anthony Luo
(74) *Attorney, Agent, or Firm* — Haynes Beffel & Wolfeld LLP

(57) ABSTRACT

A data processing system comprising: a processing subsystem supporting a plurality of consumers, each consumer being arranged to process messages received into a corresponding receive queue; a network interface device supporting a virtual interface for each of the receive queues; and a hardware accelerator coupled to the processing subsystem by the network interface device and configured to parse one or more streams of data packets received from a network so as to, for each consumer: identify in the data packets messages having one or more of a set of characteristics associated with the consumer; and frame the identified messages in a new stream of data packets addressed to a network endpoint associated with the virtual interface of the consumer so as to cause said new stream of data packets to be delivered into the receive queue of the consumer.

30 Claims, 1 Drawing Sheet

(52) U.S. Cl.
CPC ............... *G06F 2213/0058* (2013.01); *G06F 2213/3808* (2013.01)

(56) References Cited

U.S. PATENT DOCUMENTS

| | | | |
|---|---|---|---|
| 5,325,532 A | 6/1994 | Crosswy et al. | |
| 5,612,950 A | 3/1997 | Young | |
| 5,937,169 A | 8/1999 | Connery et al. | |
| 5,946,189 A | 8/1999 | Koenen et al. | |
| 6,098,112 A | 8/2000 | Ishijima et al. | |
| 6,160,554 A | 12/2000 | Krause | |
| 6,173,333 B1 | 1/2001 | Jolitz et al. | |
| 6,304,945 B1 | 10/2001 | Koenen | |
| 6,349,035 B1 | 2/2002 | Koenen | |
| 6,427,173 B1 | 7/2002 | Boucher et al. | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,557,156 B1 | 4/2003 | Guccione | |
| 6,591,302 B2 | 7/2003 | Boucher et al. | |
| 6,594,787 B1 | 7/2003 | Chesson | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,907,042 B1 * | 6/2005 | Oguchi | 370/412 |
| 6,950,961 B2 | 9/2005 | Krause et al. | |
| 6,965,941 B2 | 11/2005 | Boucher et al. | |
| 6,978,331 B1 | 12/2005 | Kagan et al. | |
| 7,065,371 B1 | 6/2006 | Kleinerman | |
| 7,089,326 B2 | 8/2006 | Boucher et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,451,456 B2 | 11/2008 | Andjelic | |
| 7,502,826 B2 | 3/2009 | Barron et al. | |
| 7,502,870 B1 | 3/2009 | Chu | |
| 7,509,355 B2 | 3/2009 | Hanes et al. | |
| 7,518,164 B2 | 4/2009 | Smelloy et al. | |
| 7,526,493 B2 | 4/2009 | Betts et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,636,703 B2 | 12/2009 | Taylor | |
| 7,650,386 B2 | 1/2010 | McMahan et al. | |
| 7,653,754 B2 | 1/2010 | Kagan et al. | |
| 7,688,838 B1 | 3/2010 | Aloni et al. | |
| 7,688,853 B2 | 3/2010 | Santiago et al. | |
| 7,702,629 B2 | 4/2010 | Cytron et al. | |
| 7,725,556 B1 | 5/2010 | Schlansker et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,835,380 B1 | 11/2010 | Aloni et al. | |
| 7,848,322 B2 | 12/2010 | Oved | |
| 7,856,488 B2 | 12/2010 | Cripe et al. | |
| 7,864,787 B2 | 1/2011 | Oved | |
| 7,895,445 B1 | 2/2011 | Albanese et al. | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,945,528 B2 | 5/2011 | Cytron et al. | |
| 7,954,114 B2 | 5/2011 | Chamberlain et al. | |
| 7,978,606 B2 | 7/2011 | Buskirk et al. | |
| 8,000,336 B2 | 8/2011 | Harel | |
| 8,103,809 B1 | 1/2012 | Michels et al. | |
| 8,156,101 B2 | 4/2012 | Indeck et al. | |
| 8,286,193 B2 | 10/2012 | Pope et al. | |
| 8,326,816 B2 | 12/2012 | Colle et al. | |
| 8,332,285 B1 * | 12/2012 | Barua et al. | 705/28 |
| 8,346,919 B1 | 1/2013 | Eiriksson et al. | |
| 8,996,644 B2 | 3/2015 | Pope | |
| 9,003,053 B2 | 4/2015 | Pope et al. | |
| 9,319,362 B1 | 4/2016 | McAllister et al. | |
| 9,456,060 B2 | 9/2016 | Pope et al. | |
| 9,600,429 B2 | 3/2017 | Pope | |
| 9,674,318 B2 | 6/2017 | Pope et al. | |
| 2001/0036184 A1 * | 11/2001 | Kinoshita et al. | 370/389 |
| 2002/0059052 A1 | 5/2002 | Bloch et al. | |
| 2002/0095519 A1 | 7/2002 | Philbrick et al. | |
| 2002/0107971 A1 | 8/2002 | Bailey et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2002/0174240 A1 | 11/2002 | Nason et al. | |
| 2002/0198990 A1 | 12/2002 | Bradfield et al. | |
| 2003/0007165 A1 | 1/2003 | Hudson | |
| 2003/0033588 A1 | 2/2003 | Alexander | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0086300 A1 | 5/2003 | Noyes et al. | |
| 2003/0140124 A1 | 7/2003 | Burns | |
| 2003/0172330 A1 | 9/2003 | Barron et al. | |
| 2003/0177253 A1 | 9/2003 | Schuehler et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0015502 A1 | 1/2004 | Alexander et al. | |
| 2004/0071250 A1 | 4/2004 | Bunton et al. | |
| 2004/0073716 A1 | 4/2004 | Boom et al. | |
| 2004/0141642 A1 | 7/2004 | Zeng et al. | |
| 2004/0156393 A1 | 8/2004 | Gupta et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210670 A1 | 10/2004 | Anerousis et al. | |
| 2004/0210754 A1 | 10/2004 | Barron et al. | |
| 2004/0240435 A1 | 12/2004 | Boucher et al. | |
| 2004/0249881 A1 | 12/2004 | Jha et al. | |
| 2004/0249998 A1 | 12/2004 | Rajagopalan et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0021874 A1 | 1/2005 | Georgiou et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0137964 A1 * | 6/2005 | Nordlicht et al. | 705/37 |
| 2005/0172181 A1 | 8/2005 | Huliehel | |
| 2005/0216597 A1 | 9/2005 | Shah et al. | |

(56) References Cited

U.S. PATENT DOCUMENTS

| | | |
|---|---|---|
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0075130 A1 | 4/2006 | Craft et al. |
| 2006/0126619 A1 | 6/2006 | Teisberg et al. |
| 2006/0165074 A1 | 7/2006 | Modi et al. |
| 2006/0187931 A1* | 8/2006 | Hwang .................. 370/392 |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0067497 A1 | 3/2007 | Craft et al. |
| 2007/0121596 A1 | 5/2007 | Kurapati et al. |
| 2007/0140250 A1* | 6/2007 | McAllister .......... H04L 12/4645 370/392 |
| 2007/0188351 A1 | 8/2007 | Brown et al. |
| 2007/0208874 A1* | 9/2007 | Previdi ............... H04L 67/1008 709/238 |
| 2007/0209069 A1 | 9/2007 | Saklikar et al. |
| 2007/0220183 A1 | 9/2007 | Kagan et al. |
| 2007/0223385 A1* | 9/2007 | Berly et al. ................. 370/250 |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0005776 A1 | 1/2008 | VerSteeg et al. |
| 2008/0008205 A1 | 1/2008 | Jung et al. |
| 2008/0024586 A1 | 1/2008 | Barron |
| 2008/0052490 A1 | 2/2008 | Botchek |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0140574 A1 | 6/2008 | Boucher et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0189373 A1 | 8/2008 | Ikonen et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0024758 A1* | 1/2009 | Levy-Abegnoli et al. ... 709/237 |
| 2009/0060197 A1 | 3/2009 | Taylor et al. |
| 2009/0165003 A1 | 6/2009 | Jacobson et al. |
| 2009/0182683 A1 | 7/2009 | Taylor et al. |
| 2009/0183057 A1 | 7/2009 | Aizman |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0012718 A1* | 1/2010 | Griswold ................. G07F 19/20 235/379 |
| 2010/0088437 A1 | 4/2010 | Zahavi |
| 2010/0128623 A1 | 5/2010 | Dunn et al. |
| 2010/0138840 A1 | 6/2010 | Kagan et al. |
| 2010/0161870 A1 | 6/2010 | Daniel |
| 2010/0169880 A1 | 7/2010 | Haviv et al. |
| 2010/0185719 A1 | 7/2010 | Howard |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0199085 A1 | 8/2010 | Barisal |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0019574 A1* | 1/2011 | Malomsoky et al. ........ 370/252 |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0151896 A1* | 6/2011 | Goldman et al. ............. 455/466 |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179315 A1 | 7/2011 | Yang |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0102245 A1 | 4/2012 | Gole et al. |
| 2012/0108230 A1* | 5/2012 | Stepanian .................. 455/422.1 |
| 2012/0136514 A1* | 5/2012 | Noffsinger et al. ............ 701/19 |
| 2012/0151004 A1 | 6/2012 | Pope |
| 2012/0246052 A1 | 9/2012 | Taylor et al. |
| 2013/0007700 A1 | 1/2013 | Indeck et al. |
| 2013/0080651 A1 | 3/2013 | Pope et al. |
| 2013/0145035 A1 | 6/2013 | Pope et al. |
| 2013/0247197 A1 | 9/2013 | O'Brien |
| 2014/0279342 A1 | 9/2014 | Maynard |
| 2014/0310149 A1 | 10/2014 | Singh |
| 2014/0310405 A1 | 10/2014 | Pope et al. |
| 2015/0019923 A1 | 1/2015 | Michels et al. |
| 2015/0049763 A1 | 2/2015 | Michels et al. |
| 2015/0161064 A1 | 6/2015 | Pope |
| 2015/0169496 A1 | 6/2015 | Pope |
| 2016/0156749 A1 | 6/2016 | Pope et al. |
| 2016/0373561 A1 | 12/2016 | Pope et al. |

FOREIGN PATENT DOCUMENTS

| | | |
|---|---|---|
| WO | 00/10095 A1 | 2/2000 |
| WO | 2001048972 A1 | 7/2001 |
| WO | 2002035838 A1 | 5/2002 |
| WO | 2008127672 A2 | 10/2008 |
| WO | 2009136933 A1 | 11/2009 |
| WO | 20090134219 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

EP 13153148.5—1953—Extended European Search Report dated Feb. 19, 2014, 6 pages.
U.S. Appl. No. 12/964,642—Notice of Allowance dated Nov. 26, 2014, 21 pages.
U.S. Appl. No. 13/624,788—Notice of Allowance dated Dec. 5, 2014, 12 pages.
U.S. Appl. No. 13/283,420—Office Action dated Dec. 3, 2014, 66 pages.
U.S. Appl. No. 13/283,420—Final Office Action dated Jul. 22, 2015, 12 pages.
U.S. Appl. No. 12/964,642—Office Action dated Feb. 12, 2014, 54 pages.
U.S. Appl. No. 12/964,642—Response to Office Action dated Feb. 12, 2014 filed Jul. 30, 2014, 16 pages.
U.S. Appl. No. 13/624,788—Office Action dated Aug. 1, 2014, 64 pages.
U.S. Appl. No. 13/283,420—Response to Final Office Action dated Jul. 22, 2015 filed Sep. 14, 2015, 16 pages.
U.S. Appl. No. 13/283,420—Notice of Allowance dated Oct. 2, 2015, 17 pages.
U.S. Appl. No. 13/754,792—Office Action dated Dec. 18, 2015, 92 pages.
U.S. Appl. No. 13/671,434—Office Action dated Mar. 23, 2016, 73 pages.
U.S. Appl. No. 15/016,659—Notice of Allowance dated May 25, 2016, 20 pages.

(56) References Cited

OTHER PUBLICATIONS

U.S. Appl. No. 14/231,510—Office Action dated Mar. 24, 2016, 16 pages.
U.S. Appl. No. 13/624,788—Office Action dated Aug. 1, 2014, 10 pages.
U.S. Appl. No. 13/624,788—Response to Office Action dated Aug. 1, 2014, filed Oct. 29, 2014, 14 pages.
U.S. Appl. No. 13/624,788—Notice of Allowance dated Dec. 5, 2014, 7 pages.
U.S. Appl. No. 13/789,353—Response to Advisory Action and Final Office Action dated Oct. 16, 2015, 14 pages.
Druschel et al., "Lazy Receiver Processing (LRP): A Network Subsytem Architecture for Server Systems," 1996, Department of Computer Science, Rice University, 15 pages.
Wikia, "Raw/TCP," IwIP—lightweight TCP/IP last changed Jun. 16, 2011,<http://Iwip.wikia.com/wiki/Raw/TCP> retrieved Aug. 30, 2016, 6 pages.
Johnson et al., "The Peregrine High-Performance RPC System—Software—Practice and Experience," Feb. 1993, vol. 23(2), pp. 201-221.
Ganger et al., "Fast and Flexible Application-Level Networking on Exokernel Systems," Feb. 2002, ACM Transactions on Computer Systems, vol. 20(1), pp. 49-83.
Engler et al., "Exokernel: An Operating System Architecture for Application-Level Resource Management," 1995, M.I.T. Laboratory for Computer Science Cambridge, MA 02139, U.S.A, pp. 1-16.
Engler et al., "DPF: Fast, Flexible Message Demultiplexing using Dynamic Code Generation," 1996, M.I.T. Laboratory for Computer Science Cambridge, MA 02139, U.S.A., pp. 1-7.
"Exokernel—Structure and Architecture of MIT's Exokernel," 2000, 18 pages.
"Introduction to the tuxgraphics TCP/IP stack, 3rd generation," generated Feb. 25, 2012, version 2.57<http://www.tuxgraphics.org/electronics/200905/embedded-tcp-ip-stack_shtml>, retrieved Aug. 30, 2016, 27 pages.
Engler et al., "Exokernels MIT Lab for Computer Science slides," 1998,<https://pdos.csail.mit.edu/archive/exo/exo-slides/sld011.htm>, 45 pages, slide 11 in particular.
Wikipedia, "TUX web server," last modified Aug. 30, 2015, <https://en.wikipedia.org/wiki/TUX_web_server>, retreived Aug. 30, 2016, 2 pages.
Kaashoek et al., "Application Performance and Flexibility on Exokernel Systems," <www2.cs.uh.edu/~paris/6360/PowerPoint/Xok.ppt> retreived Aug. 30, 2016, 23 pages, slide 10 in particular.
Kaashoek et al., "Application Performance and Flexibility on Exokernel Systems," 1995, M.I.T. Laboratory for COmputer Science, Cambridge, MA 02139, U.S.A, pp. 1-14.
"NVIDIA Tesla GPUs to Communicate Faster Over Mellanox InfiniBand Networks," press release dated Nov. 25, 2009, Portland OR, 3 pp: <http://gpgpu.org/2009/11/25/nvidia-tesla-mellanox-infiniband>.
"NVIDIA GPUDirect™ Technology—Accelerating GPU-based Systems," Mellanox Tech. Brief, May 2010, 2pp: <http://www.mellanox.com/pdf/whitepapers/TB_GPU_Direct.pdf>.
Pope, S.L. et al., "Enhancing Distributed Systems with Low-Latency Netowrking," Olivetti and Oracle Research Laboratory, Cambridge Univ. May 1998, 12 pp: <http://www.cl.cam.ac.uk/research/dtg/www/publications/public/files/tr.98.7.pdf>.
Hodges, S.J. et al., "Remoting Peripherals using Memory-Mapped Networks," Olivetti and Oracle Research Laboratory, Cambridge Univ., 1998, 3 pp: <http://www.cl.cam.ac.uk/research/dtg/www/publications/public/files/tr.98.6.pdf>.
Derek Chiou, Boon S. Ang, et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
Geoffray P., "Protocol off-loading vs on-loading in high-performance networks," 14th Symposium on High Performance Interconnects, Aug. 23, 2006, 5pp.
Dickman, L., "Protocol Offloading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
A. Edwards, et al.; "User-Space Protocols Deliver High Performance to Applications on a Low-Cost Gb/s LAN," ACM Computer Communication Review, vol. 24, No. 4, pp. 14-23, Oct. 1994.
A. Edwards, S. Muir; "Experiences Implementing a High-Performance TCP in User-Space," ACM Computer Communication Review, vol. 25, No. 4, pp. 196-205, Oct. 1995.
A. Romanow and S. Floyd; "The Dynamics of TCP Traffic over ATM Networks," ACM Computer Communication Review, vol. 24, No. 4, pp. 79-88, Oct. 1994.
Andrew D. Birrell, et al.; "Grapevine: An Exercise in Distributed Computing," Communications of the ACM, vol. 25, Issue 4, pp. 260-274, Apr. 1982.
Andy Currid; "TCP Offload to the Rescue," ACM Queue, vol. 2, No. 3, pp. 58-65, May 1, 2004.
B. Leslie, et al.; "User-level device drivers: Achieved performance," J. Comput. Sci. & Technol., vol. 20, pp. 1-17, Sep. 2005.
Babak Falsafi, et al.; "Application-Specific Protocols for User-Level Shared Memory," Proceedings of the 1994 conference on Supercomputing, pp. 380-389, Washington D.C.; Nov. 14, 1994.
Bruce Lowekamp, et al.; "Topology Discovery for Large Ethernet Networks," ACM Computer Communication Review, vol. 31, No. 4, pp. 237-248, Oct. 2001.
Bruce S. Davie; "A Host-Network Interface Architecture for ATM," ACM Computer Communication Review, vol. 21, No. 4, pp. 307-315, Sep. 1991.
C. A. Thekkath, et al.; "Implementing Network Protocols at User Level," ACM Computer Communication Review, vol. 23, No. 4, pp. 64-132, Oct. 1993.
C. Brendan S. Traw, et al.; "A High-Performance Host Interface for ATM Networks," ACM Computer Communication Review, vol. 21, No. 4, pp. 317-325, Sep. 1991.
C. Kline; "Supercomputers on the Internet: A Case Study," ACM Computer Communication Review, vol. 17, No. 5, pp. 27-33, Aug. 1987.
C. Partridge, J. Hughes, J. Stone; "Performance of Checksums and CRCS over Real Data," ACM Computer Communication Review, vol. 25, No. 4, pp. 68-76, Oct. 1995.
C. Traw and J. Smith; "Hardware/Software organization of a high performance ATM host interface," IEEE Journal on Selected Areas in Communications, pp. 1-22, Feb. 1993.
Charles Kalmanek; "A Retrospective View of ATM," ACM Computer Communication Review, vol. 32, No. 5, pp. 13-19, Nov. 2002.
Charles P. Thacker and Lawrence C. Stewart; "Firefly: a Multiprocessor Workstation," ACM Operating Systems Review, vol. 21, Issue 4, pp. 164-172, Oct. 1987.
Cheng Jin, et al.; "FAST TCP: Motivation, Architecture, Algorithms, Performance," Proceedings of IEEE Infocom 2004, 21 pages, Mar. 7, 2004.

(56) References Cited

OTHER PUBLICATIONS

Chi-Chao Chang, et al; "Low-Latency Communication on the IBM RISC System/6000 SP," Proceedings of the 1996 ACM/IEEE conference on Supercomputing, Pittsburgh, pp. 1-17, Nov. 17, 1996.
Chris Maeda, Brian Bershad; "Protocol Service Decomposition for High-Performance Networking," ACM Operating Systems Review, vol. 27, Issue 5, 12 pages, Dec. 1993.
Christopher A. Kent, Jeffrey C. Mogul; "Fragmentation Considered Harmful," ACM Computer Communication Review, vol. 17, No. 5, pp. 75-87, Oct. 1987.
Craig Partridge; "How Slow Is One Gigabit Per Second ?," ACM Computer Communication Review, vol. 20, No. 1, pp. 44-53, Jan. 1990.
D. D. Clark and D. L. Tennenhouse; "Architectural Considerations for a New Generation of Protocols," ACM Computer Communication Review, vol. 20, No. 4, pp. 200-208, Sep. 1990.
D. L. Tennenhouse, D. J. Wetherall; "Towards an Active Network Architecture," ACM Computer Communication Review, vol. 26, No. 2, pp. 5-18, Apr. 1996.
Danny Cohen, et al.; "Use of message-based multicomputer components to construct gigabit networks," ACM Computer Communication Review, vol. 23, No. 4, p. 32-44, Jul. 1993.
Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
David A. Borman; "Implementing TCP/IP on a Cray computer," ACM Computer Communication Review, vol. 19, No. 2, pp. 11-15, Apr. 1989.
David D. Clark; "The Design Philosophy of the DARPA Internet Protocols," ACM Computer Communication Review, vol. 18, No. 4, pp. 102-111, Aug. 1988.
David D. Clark, et al.; "An Analysis of TCP Processing Overhead," IEEE Communications Magazine, vol. 27, No. 6, pp. 23-29, Jun. 1989.
David R. Boggs, et al.; "Measured Capacity of an Ethernet: Myths and Reality," ACM Computer Communication Review, vol. 18, No. 4, pp. 222-234, Aug. 1988.
David R. Cheriton; "Sirpent: A High-Performance Internetworking Approach," ACM Computer Communication Review, vol. 19, No. 4, pp. 158-169, Sep. 1989.
David Wetherall; "10 Networking Papers: Readings for Protocol Design," ACM Computer Communication Review, vol. 36, No. 3, pp. 77-78, Jul. 2006.
Derek McAuley, Rolf Neugebauer; "A case for Virtual Channel Processors," Proceedings of the ACM SIGCOMM 2003 Workshops, pp. 237-242, Aug. 2003.
Derek Robert McAuley; "Protocol Design for High Speed Networks," PhD Thesis, University of Cambridge, 104 pages, Sep. 1989.
E. Blanton and M. Allman; "On Making TCP More Robust to Packet Reordering," ACM Computer Communication Review, vol. 32, No. 1, pp. 20-30, Jan. 2002.
E. Ruetsche; "The Architecture of Gb/s Multimedia Protocol Adapter," ACM Computer Communication Review, vol. 23, No. 3, pp. 59-68, Jul. 1993.
Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Edward D. Lazowska, David A. Patterson; "Computing Research: A Looming Crisis," ACM Computer Communication Review, vol. 35, No. 2, 2005, pp. 65-68, Jul. 2005.
Eric C. Cooper, et al.; "Protocol Implementation on the Nectar Communication Processor," ACM Computer Communication Review, vol. 20, No. 4, 10 pages, Sep. 1990.

Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
F.F. Kuo; "The Aloha System," ACM Computer Communication Review, vol. 4, No. 1, pp. 5-8, Jan. 1974.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
Gene Tsudik; "Message Authentication with One-Way Hash Functions," ACM Computer Communication Review, vol. 22, No. 5, pp. 29-38, Oct. 1992.
Gordon E. Moore; "Cramming more components onto integrated circuits," Electronics, vol. 38, No. 8, 4 pages, Apr. 1, 1965.
Greg Chesson; "The Evolution of XTP," Proceedings of the Third International Conference on High Speed Networking, pp. 1-10, Nov. 1991.
Greg Minshall, et al.; "Flow labelled IP over ATM: design and rationale ," ACM Computer Communication Review, vol. 36, No. 3, pp. 79-92, Jul. 2006.
Greg Regnier, et al.; ETA: Experience with an Intel Xeon Processor as a Packet Processing EngineIEEE Micro, vol. 24, No. 1, pp. 24-31, Jan. 1994.
Greg Regnier, et al.; "TCP Onloading for Data Center Servers," Computer, IEEE Computer Society, vol. 37, No. 11, pp. 48-58, Nov. 2004.
Gregory G. Finn; "An Integration of Network Communication with Workstation Architecture," ACM Computer Communication Review, vol. 21, No. 5, 12 pages, Oct. 1991.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Gregory L. Chesson; "Declaration of Dr Gregory L Chesson in *Alacritech* v. *Microsoft*," United States District Court, Northern District California, San Francisco Division, 289 pages, Feb. 4, 2005.
H. K. Jerry Chu; "Zero-Copy TCP in Solaris," Proceedings of the USENIX Annual Technical Conference, 13 pages, Jan. 1996.
H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Humaira Kamal, et al; "SCTP versus TCP for MPI," Proceedings of the 2005 ACM/IEEE conference on Supercomputing, Seattle, Washington, 14 pages, Nov. 12, 2005.
Ian Leslie and Derek R. McAuley; "Fairisle: An ATM Network for the Local Area," ACM Computer Communication Review, vol. 21, No. 4, pp. 327-336, Sep. 1991.
Ian M. Leslie, et al.; "The Architecture of the Universe Network," ACM Computer Communication Review, vol. 14, No. 2, pp. 2-9, Jun. 1984.
Ian Pratt and Keir Fraser; "Arsenic: A User-Accessible Gigabit Ethernet Interface," Proceedings of IEEE Infocom 2001, pp. 1-11; Apr. 22, 2001.
J. C. Mogul; "The Case for Persistent-Connection HTTP," ACM Computer Communication Review, vol. 25, No. 4, pp. 299-313, Oct. 1995.
J. Carver Hill; "Synchronizing Processors with Memory-Content-Generated Interrupts," Communications of the ACM, vol. 16, No. 6, p. 350-351, Jun. 1973.
J. Evans and T. Buller; "The End of History," IEEE TCGN Gigabit Networking Workshop, 10 pages, Apr. 22, 2001.
J. Vis; "A Simple LAN Performance Measure," ACM Computer Communication Review, vol. 24, No. 1, pp. 7-11, Jan. 1994.
Jack B. Dennis and Earl C. Van Horn; "Programming Semantics for Multiprogrammed Computations," Communications of the ACM, vol. 9, No. 3, pp. 143-155, Mar. 1966.
Jeffrey R. Michel; "The Design and Evaluation of an Off-Host Communications Protocol Architecture," MSci Thesis, University of Virginia, 144 pages, Aug. 1993.

(56) References Cited

OTHER PUBLICATIONS

Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.
John M. McQuillan, et al.; "An Overview of the New Routing Algorithm for the ARPANET," Proceedings of the 6th Data Communications Symposium, pp. 54-60, Nov. 1979.
John Nagle; "Congestion Control in IP/TCP Internetworks," ACM Computer Communication Review, vol. 14, No. 4, p. 11-17, Oct. 1984.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Jon Crowcroft; "10 Networking Papers: Recommended Reading," ACM Computer Communication Review, vol. 36, No. 2, pp. 31-32, Apr. 2006.
Jon Crowcroft, Derek McAuley; "ATM: A Retrospective on Systems Legacy," ACM Computer Communication Review, vol. 32, No. 5, pp. 11-21, Nov. 2002.
Jonathan Kay and Joseph Pasquale; "The Importance of Non-Data Touching Processing Overheads in TCP/IP," ACM Computer Communication Review, vol. 23, No. 4, 10 pages, Oct. 1993.
Jonathan M. Smith and C. Brendan S. Traw; "Giving Applications Access to Gb/s Networking," IEEE Network, vol. 7, Issue 4, 14 pages, Jul. 1993.
Jonathan Smith; "The Influence of ATM on Operating Systems," ACM Computer Communication Review, vol. 32, No. 5, pp. 29-37, Nov. 2002.
Jonathan Stone, Craig Partridge; "When the CRC and TCP Checksum Disagree," ACM Computer Communication Review, vol. 30, No. 4, 11 pages, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
K. Kleinpaste, P. Steenkiste, B. Zill; "Software Support for Outboard Buffering and Checksumming," ACM Computer Communication Review, vol. 25, No. 4, pp. 87-98, Oct. 1995.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, Rennes, France, 10 pages, Aug. 28, 2007.
L. S. Brakmo, et al.; "TCP Vegas: New Techniques for Congestion Detection and Avoidance," ACM Computer Communication Review, vol. 24, No. 4, pp. 24-35, Oct. 1994.
M. Allman; "TCP Byte Counting Refinements," ACM Computer Communication Review, vol. 29, No. 3, pp. 14-22, Jul. 1999.
M. de Vivo, et al.; "Internet Vulnerabilities Related to TCP/IP and T/TCP," ACM Computer Communication Review, vol. 29, No. 1, pp. 81-85, Jan. 1999.
M. Kaiserswerth; "The Parallel Protocol Engine," IEEE/ACM Transactions in Networking vol. 1, Issue 6, pp. 650-663, Dec. 1993.
M.V. Wilkes and R.M. Needham; "The Cambridge Model Distributed System," ACM SIGOPS Operating Systems Review, vol. 14, Issue 1, pp. 21-29, Jan. 1980.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
Mark David Hayter; "A Workstation Architecture to Support Multimedia," PhD Thesis, University of Cambridge, 111 pages, Sep. 1993.
Mark Hayter, Derek McAuley; "The Desk Area Network," ACM Operating Systems Review, vol. 25, Issue 4, pp. 1-11, Oct. 1991.
Marvin Zelkowitz; "Interrupt Driven Programming," Communications of the ACM, vol. 14, No. 6, p. 417-418, Jun. 1971.
Matthias Kaiserswerth; "The Parallel Protocol Engine," IEEE/ACM Transactions in Networking vol. 1, Issue 6, pp. 650-663, Dec. 1993.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Michael J. Dixon; "System support for multi-service traffic," University of Cambridge Computer Laboratory Technical Report, No. 245, pp. 1-108, Jan. 1992.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Nanette J. Boden, et al.; "Myrinet: A Gigabit-per-Second Local-Area Network," Draft of paper published in IEEE Micro, vol. 15, No. 1, pp. 1-15, Nov. 16, 1994.
NR Adiga, et al.; "An Overview of the BlueGene/L Supercomputer," Proceedings of the 2002 ACM/IEEE conference on Supercomputing, pp. 1-22, Baltimore; Nov. 16, 2002.
O. Angin, et al.; "Report on the 5th IFIP Internation Workshop on Quality of Service (IWQOS 97)," ACM Computer Communication Review, vol. 27, No. 3, pp. 100-117, Jul. 1997.
P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
P. Druschel, et al; "Experiences with a High-Speed Network Adaptor: A Software Perspective," ACM Computer Communication Review, vol. 24, No. 4, pp. 2-13, Oct. 1994.
P. Kermani and L. Kleinrock; "Virtual cut-through: A new computer communciation switching technique," Computer Networks, vol. 3, No. 4, pp. 267-286, Sep. 1979.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Patrick Geoffray; "A Critique of RDMA," HPCWire article: http://www.hpcwire.com/features/17886984.html, 7 pages, Aug. 18, 2006.
Paul E. McKenney and Ken F. Dove; "Efficient Demultiplexing of Incoming TCP Packets," ACM Computer Communication Review, vol. 22, No. 4, pp. 269-279, Oct. 1992.
Paul Ronald Barham; "Devices in a Multi-Service Operating System," PhD Thesis, University of Cambridge, 142 pages, Jul. 1996.
Paul V. Mockapetris, Kevin J. Dunlap; "Development of the Domain Name System," ACM Computer Communication Review, vol. 18, No. 4, pp. 112-122, Aug. 1988.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Peter Steenkiste; "Analyzing Communication Latency using the Nectar Communication Processor," ACM Computer Communication Review, vol. 22, No. 4, pp. 199-209, Oct. 1992.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.

(56) References Cited

OTHER PUBLICATIONS

Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
R. Braden, et al.; "Computing the Internet Checksum," ACM Computer Communication Review, vol. 19, No. 2, pp. 86-94, Apr. 1989.
R. Bush, D. Meyer; "Some Internet Architectural Guidelines and Philosophy," IETF Network Working Group, Request for Comments: 3439, pp. 1-25, Dec. 2002.
R. J. Black, I. Leslie, and D. McAuley; "Experiences of Building an ATM Switch for the Local Area," ACM Computer Communication Review, vol. 24, No. 4, pp. 158-167, Oct. 1994.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Raj K. Singh, et al.; "A Programmable Network Interface for a Message-Based Multicomputer," ACM Computer Communication Review, vol. 24, No. 3, pp. 8-17, Jul. 1994.
Robert M. Brandriff, et al.; "Development of a TCP/IP for the IBM/370," ACM Computer Communication Review, vol. 15, No. 4, pp. 2-8, Sep. 1985.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE conference on Supercomputing, Denver, CO, 17 pages, Nov. 10, 2001.
S. L. Pope, et al.; "Enhancing Distributed Systems with Low-Latency Networking," Parallel and Distributed Computing and Networks, Brisbane, Australia, pp. 1-12, Dec. 1998.
Sally Floyd; "TCP and Explicit Congestion Notification," ACM Computer Communication Review, vol. 24, No. 5, p. 8-23, Oct. 1994.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Steven Pope, David Riddoch; "10Gb/s Ethernet Performance and Retrospective," ACM Computer Communication Review, vol. 37, No. 2, pp. 89-92, Mar. 19, 2007.
Stuart Wray, et al.; "The Medusa Applications Environment," Proceedings of the International Conference on Multimedia Computing and Systems, Boston, MA, 9 pages, May 1994.
Sumitha Bhandarkar, et al.; "LTCP: Improving the Performance of TCP in Highspeed Networks," ACM Computer Communication Review, vol. 36, No. 1, pp. 41-50, Jan. 2006.
Thomas Sterling, et al.; "Beowolf: A Parallel Workstation for Scientific Computation," Proceedings of the 24th International Conference on Parallel Processing, pp. 1-4, Aug. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
Tom Kelly; "Scalable TCP: Improving Performance in Highspeed Wide Area Networks," ACM Computer Communication Review, vol. 33, No. 2, pp. 83-91, Apr. 2003.

V. Cerf, et al.; "Proposal for an International End-to-End Protocol," ACM Computer Communication Review, vol. 6 No. 1, pp. 63-89, Jan. 1976.
V. Jacobson; "Congestion Avoidance and Control," ACM Computer Communication Review, vol. 18, No. 4, pp. 157-173, Aug. 1988.
Various forum members; "MPI: A Message-Passing Interface Standard," Message-Passing Interface Forum, University of Tennessee, Knoxville, 236 pages, May 5, 1994.
Vinay Aggarwal, et al.; "Workshop on network-I/O convergence: experience, lessons, implications (NICELI)," ACM Computer Communication Review, vol. 33, No. 5, pp. 75-80, Oct. 2003.
Vinton Cerf, Robert Kahn; "A Protocol for Packet Network Intercommunication," IEEE Transactions on Communications, vol. COM-22, No. 5, 13 pages, May 1974.
W. E. Leland, et al.; "On the Self-Similar Nature of Ethernet Traffic," ACM Computer Communication Review, vol. 23, No. 4, pp. 183-193, Oct. 1993.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
W. Feng, et al.; "Performance Characterization of a 10-Gigabit Ethernet TOE," Proceedings of the 13th Symposium on High Performance Interconnects, pp. 1-6, Aug. 17, 2005.
Wu-chun Feng, et al.; "Optimizing 10-Gigabit Ethernet for Networks ofWorkstations, Clusters, and Grids: A Case Study," Proceedings of the 2003 ACM/IEEE conference on Supercomputing, Phoenix, Arizona, 13 pages, Nov. 15, 2003.
EP 12185546.4—Extended European Search Report dated Jul. 13, 2013, 6 pages.
U.S. Appl. No. 15/253,822—Office Action dated Jul. 6, 2017, 8 pages.
U.S. Appl. No. 15/253,822—Office Action dated Jun. 1, 2017, 59 pages.
U.S. Appl. No. 13/754,792—Office Action dated Jul. 14, 2017, 116 pages.
U.S. Appl. No. 15/253,822—Response to Office Action dated Jul. 6, 2017 filed Oct. 6, 2017, 14 pages.
U.S. Appl. No. 15/253,822—Notice of Allowance dated Oct. 19, 2017, 11 pages.
U.S. Appl. No. 13/754,792—Response to Office Action dated Jul. 14, 2017 filed Dec. 14, 2027, 25 pages.
Druschel, "Operating System Support for High-Speed Communication," Communications of the ACM 39, No. 9, Sep. 1996, pp. 41-51.
U.S. Pat. No. 8,645,558—Declaration of Kevin Jeffay under 37 C.F.R. § 1.68, filed Sep. 15, 2016, 66 pages.
Kurose and Ross, "Computer Networking: A Top-Down Approach Featuring the Internet," Addison Wesley, 3rd edition (May 23, 2004), 51 pages.
Mansley, "Engineering a User-Level TCP for the CLAN Network," In Proceedings of the ACM SIGCOMM workshop on Network-I/O convergence: experience, lessons, implications, 2003, 9 pages.
Maquelin, et al., "Polling Watchdog: Combining Polling and Interrupts for Efficient Message Handling," ACM SIGARCH Computer Architecture News. vol. 24. No. 2. ACM, 1996, pp. 179-188.
Perlman, "Interconnections: Bridges, Routers, Switches, and Internetworking Protocols," 2nd edition, Addison-Wesley, 1999, pp. 168-292.
Riddoch et al., "Distributed Computing with the CLAN Network," In Local Computer Networks, 2002. Proceedings. LCN 2002, 27th Annual IEEE Conference on, 10 pages.
Tanenbaum, "Computer Networks", Prentice Hall, 4th edition, 2003, pp. 61-65.
U.S. Appl. No. 15/287,666—Office Action dated Jan. 16, 2018, 91 pages.
U.S. Appl. No. 13/671,434—Response to Mar. 23 Office Action filed Jul. 8, 2016, 18 pages.
U.S. Appl. No. 13/671,434—Notice of Allowance dated Nov. 7, 2016, 8 pages.
U.S. Appl. No. 13/754,792—Response to Dec. 18 Office Action filed Jun. 16, 2016, 22 pages.

(56) References Cited

OTHER PUBLICATIONS

U.S. Appl. No. 13/754,792—Final Office Action dated Sep. 23, 2016, 36 pages.
U.S. Appl. No. 14/231,510—Response to Mar. 24 Office Action filed Aug. 22, 2016, 14 pages.
U.S. Appl. No. 14/231,510—Notice of Allowance dated Jan. 31, 2017, 5 pages.
U.S. Appl. No. 15/016,659—Notice of Allowance dated Jun. 20, 2016, 24 pages.
U.S. Appl. No. 13/754,792—Response to Final Office Action dated Sep. 23, 2016 filed Dec. 22, 2016, 20 pages.
EP 17167472.4-1870—Extended European Search Report dated Jun. 30, 2017 (7 pages).
U.S. Appl. No. 14/629,394—Notice of Alloweance dated Sep. 27, 2017, 87 pages.
U.S. Appl. No. 14/629,319—Notice of Allowance dated Oct. 3, 2017, 89 pages.
U.S. Appl. No. 15/287,666—Office Action dated Jan. 16, 2018, 99 pages.
U.S. Appl. No. 15/481,350—Office Action dated Jan. 11, 2018, 41 pages.
U.S. Appl. No. 15/455,864—Office Action dated Mar. 27, 2019, 69 pages.
U.S. Appl. No. 15/455,864—Notice of Allowance dated May 28, 2019, 21 pages.
U.S. Appl. No. 15/881,312—Notice of Allowance dated Apr. 9, 2019, 40 pages.
U.S. Appl. No. 15/881,312—Amendment Under 1.312 filed Jun. 5, 2019, 5 pages.
U.S. Appl. No. 15/455,864—Response to Office Action dated Mar. 27, 2019, as filed Apr. 30, 2019, 9 pages.

\* cited by examiner

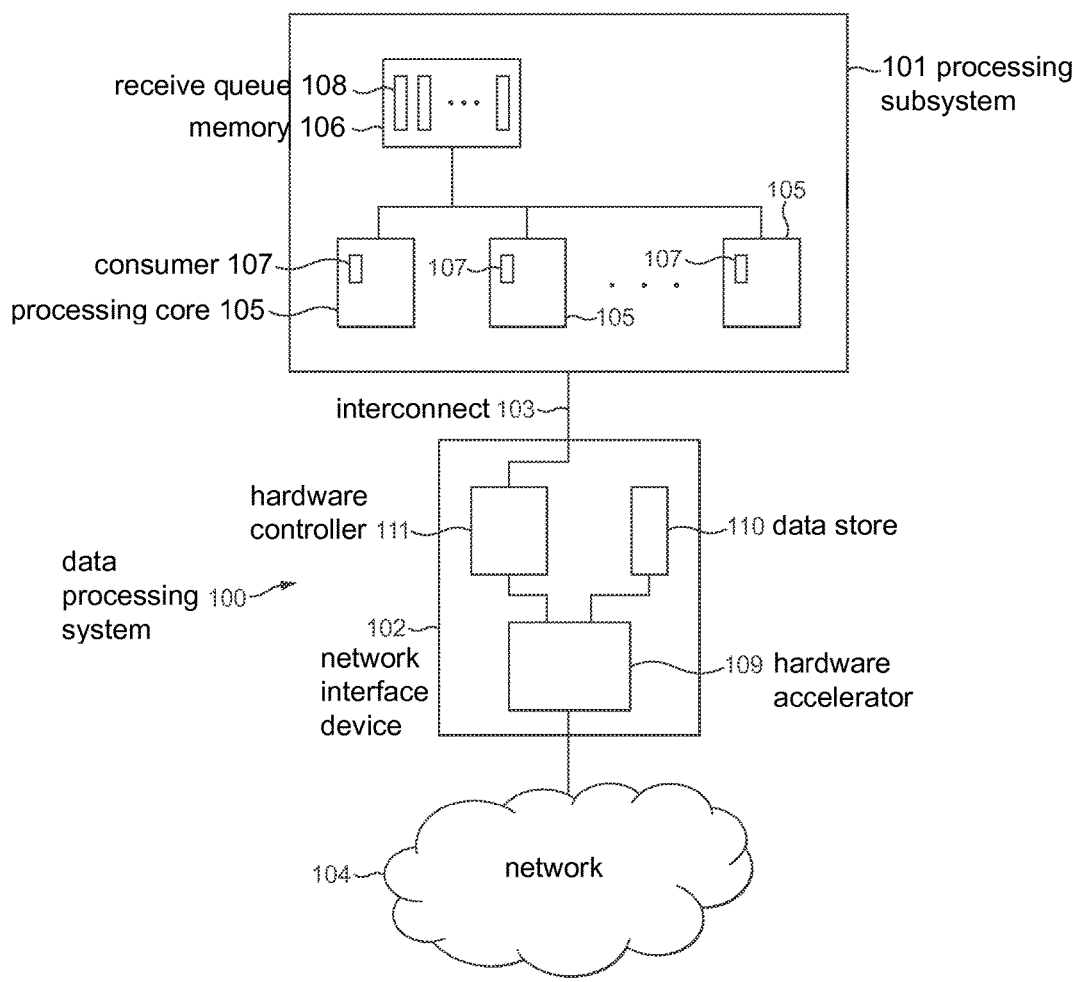

FEED PROCESSING

CROSS REFERENCE TO OTHER APPLICATIONS

This application claims the benefit of prior U.S. Provisional Patent Application No. 61/714,405, filed 16 Oct. 2012, which application is incorporated herein by reference in its entirety.

BACKGROUND

The invention relates to a data processing system and method for distributing messages received in streams of data packets to software consumers.

There are an increasing number of applications that require streams of network messages to be consumed and processed at very high data rates. For example, electronic financial exchanges typically provide several data feeds comprising messages carrying market parameters such as security buy/sell values or trade orders. Each of these feeds can have data rates that currently peak at over two million messages per second and present a considerable processing challenge to a computer system configured to receive the feeds, such as a bank trading system. Other examples of receivers that are required to process message streams at high data rates include servers hosting databases, file caches and webservers.

Generally, the size of each message in such systems will be relatively small compared to the size of data packets in which data is carried over a network to the receivers. Many messages are therefore packed into each data packet in order to maximise the efficiency of message transmission. This requires the receiver to parse the streams of data packets it receives in order to identify each message and pass it on to the appropriate consumer at the receiver.

Typically, the consumers running in software at a computer system configured to receive such data streams will each require only a subset of the messages contained in the streams. For example, trading software at a bank computer system would typically be configured to normalise and re-publish, or trade based on a limited number of securities.

So as to not overload the consumers with irrelevant messages, a dispatcher process is required to parse each data packet stream to identify the messages and then forward on to each consumer only those messages that are required. However, because of the sequential nature of parsing an individual data stream, the dispatcher for a given data-feed will be a process thread running at a single core and is therefore the limiting factor on the speed of the overall system. In other words, whilst the consumer software might be designed to efficiently distribute its processing across multiple cores of the system by executing threads in parallel, the dispatcher and hence the consumer software it serves remains limited by the speed of the core at which the dispatcher is running. This problem is more generally known as Amdahl's Law, which expresses that the speed of a parallelised computation is bound by the speed of the sequential portion of the computation. Even where the streams are provided as separate data-feeds (e.g., on separate IP multicast addresses) and therefore multiple dispatcher threads may be operating in parallel on some of the cores of the computer system, ultimately processing will be bottlenecked.

Furthermore, the bottleneck resulting from the use of a software dispatcher is generally aggravated by the fact that all of the messages of a data stream are provided to the host for handling at the dispatcher process. In most cases however, not all of the messages of a data stream are required by the consumers of the host and the dispatcher process therefore wastes resources and increases latency in the system by handling messages that are not wanted by the host.

There is therefore a need for an improved method for handling streams of data packets at a data processing system.

SUMMARY OF THE INVENTION

According to a first aspect of the present invention there is provided a data processing system comprising:
  a processing subsystem supporting a plurality of consumers, each consumer being arranged to process messages received into a corresponding receive queue;
  a network interface device supporting a virtual interface for each of the receive queues; and
  a hardware accelerator coupled to the processing subsystem by the network interface device and configured to parse one or more streams of data packets received from a network so as to, for each consumer:
    identify in the data packets messages having one or more of a set of characteristics associated with the consumer; and
    frame the identified messages in a new stream of data packets addressed to a network endpoint associated with the virtual interface of the consumer so as to cause said new stream of data packets to be delivered into the receive queue of the consumer.

Preferably the hardware accelerator is configured to not forward said one or more streams of data packets received from the network.

Preferably the hardware accelerator is supported at the network interface device.

Preferably each new stream of data packets for a consumer is formed in accordance with a predetermined network protocol.

Suitably each new stream of data packets for a consumer is formed in accordance with the same network protocol in accordance with which received streams of data packets comprising messages for the new stream are formed.

Preferably the hardware accelerator is further configured to, on parsing each stream of data packets received from the network, identify control messages intended for all recipients of messages of that received data stream and include those control messages in each of the new streams of data packets directed to consumers that are recipients of messages from that received data stream. Alternatively the hardware accelerator is further configured to, on parsing each stream of data packets received from the network, identify control messages intended for all recipients of messages of that received data stream and include those control messages in a new streams of data packets directed to one or more predetermined consumers of the set of consumers that are recipients of messages from that received data stream.

Suitably at least one of the streams of data packets received from the network is a financial data feed from an electronic exchange and the control messages in that data stream intended for all recipients of messages of that received data stream are control messages relating to the operation of the electronic exchange and intended for all subscribers to that financial data feed.

Suitably each new stream of data packets for a consumer is formed in accordance with the same application layer protocols with which the received streams of data packets comprising messages for the new stream are formed.

Preferably the hardware accelerator is configured to duplicate messages that have characteristics associated with more than one consumer so as to provide those messages to each of those consumers in their respective new data streams.

Preferably the hardware accelerator is configured to do one of the following on receiving messages that do not have any of the characteristics associated with the consumers and are not control messages intended for all recipients of messages from the received data streams:
 discard those messages;
 deliver those messages in a data stream to one or more predetermined consumers; or
 deliver each of those messages in a data stream to a consumer selected by means of a hash performed over one or more characteristics of that message.

Preferably the hardware accelerator is configured to, on receiving a stream of data packets that includes redundant forward error correction information, use the forward error correction information to attempt to recover any missing data packets and discard the forward error correction information prior to parsing the stream of data packets.

Preferably the hardware accelerator is configured to discard duplicate messages in a received stream of data packets.

Suitably the hardware accelerator is configured to, for a given consumer, convert messages identified in the received data streams for that consumer into a predefined data format prior to inclusion of the identified messages in the corresponding new data stream.

Suitably the hardware accelerator is configured to, prior to inclusion of the identified messages in a new data stream, process at least some of the identified messages by performing one or more of:
 conversion of predefined data representations in the identified messages into host endian natural representations;
 conversion of predefined numeric values in the identified messages into a binary numeric format;
 decompression of the identified messages; and
 discarding unwanted fields from the identified messages.

Preferably the hardware accelerator is configured to deliver data packets of a new data stream into its corresponding receive queue according to a reliable delivery mechanism.

The data processing system preferably further comprises, for each of the consumers, a protocol processing entity, the protocol processing entity configured to process the new stream of data packets so as to extract the identified messages for that respective consumer. Preferably the protocol processing entity is arranged to be supported at the same processing core as its respective consumer. Preferably each of the protocol processing entities is a user-level protocol processing entity. Preferably the receive queue of each respective consumer is held in memory mapped into the address space of that user-level protocol processing entity.

Suitably one or more of the consumers belong to a user-level application supported at an operating system of the processing subsystem, the application being configured to cause the operating system to load a consumer at each of a plurality of processing cores of the data processing system so as to distribute the consumers across the processing cores of the processing subsystem.

Preferably each consumer is configured to identify to the hardware accelerator at least some of the set of characteristics to be associated with that consumer.

Preferably the hardware accelerator or network interface device further comprises a data store holding for each of the consumers the set of characteristics associated with that consumer.

The data processing system preferably further comprises a software interface configured to, in response to an appropriately formatted request from a consumer that includes a representation of a set of characteristics identifying messages required by that consumer, cause that set of characteristics to be stored at the data store and associated with the consumer.

Suitably the software interface is configured to write the set of characteristics to the data store by means of a driver of the network interface device.

Suitably the software interface is an application programming interface.

Preferably the hardware accelerator is configured to update the sets of characteristics stored at the data store in respect of each consumer in dependence on information received in messages from the network.

Preferably the hardware accelerator is configured to identify in messages having one or more of a set of characteristics associated with a consumer associations between one or more characteristics of the current set and a new characteristic not currently associated with that consumer, the hardware accelerator being configured to store said new characteristic at the data store and associate the new characteristic with the consumer.

Suitably at least one of the consumers is a financial consumer configured to process messages relating to financial securities. Suitably the financial consumer is configured to identify a set of characteristics to the hardware accelerator that includes one or more of: security symbol, order ID, an identifier of the financial exchange at which the message originates, and a price or other financial parameter of a security or a market. Suitably the new characteristic is an order ID not yet known to the respective consumer and the one or more characteristics of the current set is a security symbol.

Suitably the processing subsystem and network interface device are coupled together by means of a data bus.

Preferably the network interface device is configured to write directly into the receive queues of the consumers by means of direct memory access.

Preferably the hardware accelerator is a reconfigurable logic device.

According to a second aspect of the present invention there is provided a method for distributing messages to consumers at a data processing system comprising a processing subsystem, a network interface device, and a hardware accelerator coupled to the processing subsystem by the network interface device, the processing subsystem supporting a plurality of consumers, each consumer being arranged to process messages received into a corresponding receive queue, and the method comprising:
 a consumer requesting messages from one or more streams of data packets received at the hardware accelerator by indicating to the hardware accelerator a set of characteristics identifying those messages; and
 on receiving the one or more streams of data packets from a network, the hardware accelerator parsing the streams of data packets and, for each consumer:
  identifying in the data packets messages having one or more of the set of characteristics indicated to the network interface device by the consumer; and
  framing the identified messages in a new stream of data packets addressed to a network endpoint associated with a virtual interface provided at the network interface device so as to cause said new stream of data packets to be delivered into the receive queue of the consumer.

BRIEF DESCRIPTION OF THE DRAWINGS

The present invention will now be described by way of example with reference to the accompanying drawings, in which:

FIG. 1 is a schematic diagram of a data processing system configured in accordance with the present invention.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art. The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to data processing systems configured to support a plurality of message consumers in software. A data processing system configured in accordance with the present invention could be a computing device of any kind, such as a server or personal computer. The data processing system could include a plurality of processing cores each operable to support a consumer (although it should be noted that not all processing cores need support a consumer). Each processing core could be single core of a multi-core processor, or a distinct processor, with the processors being any kind of processing unit operable to support a software consumer.

A data processing system configured in accordance with the present invention is shown in FIG. 1. Data processing system 100 comprises a processing subsystem 101 coupled to a network 104 by means of a network interface device 102. Processing subsystem 101 is connected to network interface device (NIC) 102 by interconnect 103, which would typically be a data bus. The processing subsystem in this example comprises a plurality of processing cores 105 and a memory 106 (which could comprise any number, type or combination of memory modules). The network interface device comprises a hardware accelerator 109 coupled to the processing subsystem by network interface device 102. The hardware accelerator is preferably a reconfigurable logic device, such as an FGPA.

Processing subsystem 101 supports a software environment that includes consumers 107 for processing messages received in one or more streams of data packets received over network 104. The hardware accelerator is configured to parse data packets received from the network so as to identify the application layer messages required by the consumers. Each consumer is a software entity configured to receive and process messages from an associated receive queue. For example, a consumer could be any kind of program, application, process or thread supported at a processing core of the processing subsystem.

Each of the consumers receives data packets from NIC 102 into a corresponding receive queue 108 in memory 106. If the communication path between the accelerator and consumer is supported by a user-level networking stack of the processing subsystem it is preferable that the receive queue is locally addressable by the consumer such that the processing of messages occurs local to the receive queue (i.e. the receive queue is located in the address space of the consumer). If the communication path between the accelerator and consumer is supported by a kernel-level networking stack of a multi-core processing subsystem, it is preferable that the receive queue is at the same NUMA node as the consumer such that the processing of messages occurs local to that node of the system. The consumers could be part of a multi-threaded application configured to distribute its processing over a plurality of processing cores by arranging that its threads are supported at different processing cores of the system. Typically a memory controller for memory 106 and bus interface for data bus 103 would be integrated on the CPU dies supporting processing cores 105.

Data processing system 100 is arranged to receive one or more streams of data packets over network 104. On receiving the streams, accelerator 109 parses the data packets so as to identify the messages therein and extracts those messages having characteristics which indicate that one or more of the consumers 107 have requested to receive that message. Preferably the network interface device (possibly the accelerator itself) includes a data store 110 identifying which messages each consumer has requested to receive. This can be achieved by arranging that the data store holds information representing the characteristics of messages requested by each consumer. Such characteristics could be any suitable identifiers in the received messages. For example, each message might include a header or be of a predetermined format such that the accelerator can be configured to compare the contents of predetermined fields or message parameters with those held in the data store. The characteristics could be provided to the NIC by or on behalf of the consumer, or could be updated by the accelerator itself in dependence on data received over the network.

For example, the data processing system could be a financial trading system at a bank receiving multiple data feeds from one or more electronic financial exchanges. In this example, the characteristics used to identify messages requested by a given consumer could be one or more of security symbol, order ID (e.g. for a buy/sell/offer/quote message), an identifier of the financial exchange at which the message originates, and a price or other financial parameter of a security or a market. Thus, a consumer at one processor could request all messages relating to a first set of securities by causing the corresponding set of security symbols and any related order IDs (e.g. relating to trades in that those securities by other parties) to be stored in the data store in respect of that consumer. Preferably the accelerator would be configured to update its data store in response to data received in messages from the network. For example, financial data feeds typically identify in a message to subscribers the underlying security to which each new order ID relates, and in subsequent messages regarding that order just the order ID would be used. The accelerator is preferably configured to store each new association so as to allow new messages that comprise only an order ID to be matched to the underlying security in which one or more consumers have registered an interest.

For messages received at the accelerator that do not match the characteristics associated with any consumer, the accelerator would preferably discard those messages, but could alternatively: (i) deliver those messages to a default consumer; (ii) deliver those messages to all consumers; (iii) spread those messages over a predetermined set of consumers (e.g. by hashing one or more characteristics and using the hash to distribute the messages evenly over the consumers.

Processing subsystem 101 preferably includes a software interface (not shown in the figures) such as an application programming interface (API) by means of which the consumers 107 or another entity on behalf of the consumers can submit requests for messages received at the network interface device. Each request includes an expression of the characteristics of the messages that the respective consumer wants to receive. The interface is configured to receive the message requests from the consumers or other software entities managing the consumers and/or forming part of a greater application of which the consumers form a part. In response to the requests, the interface causes appropriate information to be written to the data store to express the set of message characteristics requested by the consumer.

The interface would typically effect the writing of requested message characteristics to the data store by means of a driver of the network interface device or accelerator, or another entity permitted to access the data store at the network interface device/accelerator. In this manner, the messages required by each consumer can be registered at the network interface device/accelerator.

Typically the processing subsystem would comprise an operating system supporting a user-level application environment. The consumers could be provided at the operating system but would preferably be at user level. The software architecture of the processing subsystem could take any suitable form: for example, the subsystem could comprise one or more virtualised operating systems supported atop a hypervisor or other similar software layer, and the consumers could be supported by one or more different virtualised operating systems. For maximum performance, a user-level consumer could be provided with a user-level protocol stack that is interfaced directly to a virtual network interface of the NIC.

On extracting the requested messages from the streams of data packets received at the NIC, the accelerator is configured to form new data packets streams, one for each of the consumers supported at processing cores 105. The new data packet streams are preferably formed in memory at accelerator 109. The memory could be the same memory that holds data store 110. The "new" data packet streams are new in the sense that the streams originate at the hardware accelerator; once established, the new data packet streams are preferably re-used to communicate data packets formed at the accelerator to each respective consumer. The data packets for each of the consumers comprise the messages requested by that consumer; thus, a given message could be duplicated across more than one of the new data streams. The headers for the new streams would be generated according to the delivery requirements of the consumers. For example, each generated new data stream could have a unique new IP destination address so as to cause each data stream to be delivered to the correct endpoint/receive queue. The data packets of the streams received at the accelerator are preferably not passed onto the processing subsystem and only the new streams of data packets are written into the receive queues of the host. Most preferably the hardware accelerator is configured to not forward onto any network endpoints said one or more streams of data packets received from the network, said network endpoints including endpoints of the processing subsystem.

Any control messages relevant to the consumers of a given data stream received at the NIC are preferably passed onto those consumers that have associated characteristics indicating one or more messages in that received data stream. For example, if a received data stream is a financial data feed from an electronic exchange, that data feed would typically include control messages intended for all consumers receiving messages from that feed, such as control messages indicating the start and end of trading each day so as to inform subscribers to the feed when trading at the exchange is to start and stop. Alternatively, one or more predetermined consumers could be arranged to receive such control messages—this can be useful if a plurality of consumers of the system belong to a single application, with one of those consumers being configured to receive control messages relating to the data streams the application has requested to receive.

Accelerator 109 is configured to encapsulate the messages requested by each consumer in data packets configured according to any suitable network protocol. Each consumer could require streams of data packets according to a different protocol but preferably the network protocol would be the same for all new data streams. The protocols by which data packets of the new streams comprising a given set of messages are formed could differ from the protocols by which the data packets comprising those messages are received at the NIC. Thus, data packet streams of different network protocols that are received at the NIC could be normalised for each consumer into new data packet streams according to a predetermined network protocol. Thus, in the example that the data processing system 100 is a trading system, the NIC could receive two streams: a first stream of data packets according to the UDP protocol and a second stream of data packets according to the TCP protocol, with new streams created at the accelerator and comprising messages from both incoming packet streams being, for example, streams of UDP data packets.

Accelerator 109 could be further configured to convert received messages into a predefined message format prior to including those messages in a data stream for a consumer. This can have performance advantages because the accelerator can be configured to perform processing that can be done more efficiently in hardware than in software (e.g. decompression of compressed messages) and it can ensure that all messages are received at the consumer in a common format (e.g. all messages are FIX messages). Examples of the processing that could be performed by the accelerator in order to convert received messages into the correct format for a given consumer include: conversion of predefined data representations into host endian natural representations; conversion of predefined numeric values into a binary numeric format; and decompression of the received messages that are identified as being for inclusion in a data packets of a new data stream for the given consumer. Performing decompression can be useful when the received streams of data packets are financial data feeds from an electronic exchange and the messages are compressed according to the FIX/FAST protocol. Performing decompression of compressed FIX/FAST messages at the accelerator reduces latency and improves performance of the trading system.

Preferably the data packet streams created at the accelerator for the consumers are UDP protocols or another lightweight, preferably connectionless, protocol. Since the data packets need travel only from the NIC up to a receive queue at processing subsystem 101, the data packets could be formed without any check data (i.e. the step of forming packet checksums could be omitted). Preferably the data packets are delivered to the processing subsystem according to a reliable data protocol.

The data packets of the new streams generated at the accelerator are directed to network endpoints associated with the appropriate consumer such that the messages requested by a process are delivered in a new stream of data packets into the receive queue of that consumer. This is achieved by arranging that the NIC provides a virtual interface for each consumers receive queue. By directing the data packet streams to predetermined endpoints (which could be defined in data store 110 but preferably are held in state at accelerator 109), the accelerator can cause each new stream to be delivered into the appropriate receive queue. By arranging that a consumer and its receive queue are local to one another (e.g. at the same NUMA node or in, or mapped into, the same user level address space of the same virtualised operating system at the host), each new stream of data packets is delivered into a memory location which is local to the corresponding consumers. This allows the new streams of data packets to be consumed without context switching and without any forwarding of the new data packet streams.

Preferably a hardware controller 111 of the network interface device is configured to provide the virtual interfaces and handle the transmission of data packets over interconnect 103 into the receive queues 107 of the host processing subsystem in the conventional manner. The transmission of data packets over interconnect 103 is preferably performed by means of direct memory access (DMA) transfers into a memory supporting the receive queues.

As the data packets of each new stream are received into the respective receive queues, those data packets must be processed according to the relevant network protocols in order to extract the messages therein. It is advantageous if a protocol processing entity (such as a transport library) is provided at each consumer and configured to perform the protocol processing of data packets received at the receive queue of the consumer supported at that core. This ensures that both the protocol processing of a given data packet and the processing of the messages therein by the relevant consumer takes place on the same core, and avoids the costly overheads such as cache bouncing that occur when processing moves between cores. The protocol processing entities could be configured to post the messages into an intermediate queue accessible to the consumers.

In the case that the consumers are user level consumers, it is advantageous if the protocol processing entities provided at the cores are user level entities and the receive queues are mapped into the address space of the user level entities so as to avoid context switches between the kernel and user level when data packets are consumed from the receive queues.

In alternative embodiments, NIC 102 could be configured to perform at least some protocol processing such that the messages contained within the data packets of each stream are extracted at the NIC (e.g. at an offload engine of controller 111) and posted into the corresponding receive queues for consumption directly by the consumers.

In accordance with the present invention, the accelerator receives one or more streams of data packets from a network and pushes out a customised stream of data packets to each of the consumers. In this manner, the accelerator distributes in hardware the processing of the messages received in the data packets streams across the consumers of the system without requiring a software dispatcher to parse and split out the received messages. By arranging that the consumers are distributed over the processing cores of the system the present invention therefore allows the burden of message processing to be evenly shared over the cores of the system.

In certain embodiments, the NIC might receive one or more redundant data streams such that if any data packets are missing from one stream there is a chance the data packet will be available from a redundant stream. In such embodiments, the accelerator is preferably configured to aggregate the streams into a single stream so as to recover any missing data packets and discard any duplicate messages prior to parsing the single stream of data packets.

In certain embodiments of the present invention, the NIC might receive a stream which contains redundant forward error correction (FEC) information. In such embodiments, the accelerator is preferably configured to use the FEC information to recover any missing data packets and discard redundant information prior to parsing the stream of data packets.

The NIC and accelerator described herein need not be provided at the same device and could be, for example, separate peripheral boards of data processing system 100 connected together by means of an interconnect (e.g. bus 103) or a dedicated link.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device comprising:
   circuitry configured to support a virtual interface for each of a plurality of receive queues associated with a plurality of application layer consumers comprised within a processing subsystem;
   a hardware accelerator configured to parse one or more streams of data packets received from a network so as to:
   identify application layer messages within the received data packets and extract application layer messages having one or more of a respective set of characteristics requested by a respective application layer consumer;
   duplicate application layer messages that have one or more of the respective set of characteristics associated with more than one application layer consumer so as to provide those application layer messages to each of those application layer consumers; and
   frame the identified application layer messages in a new stream of data packets for each application layer consumer, by encapsulating the identified application layer messages with headers identifying each respective application layer consumer into data packets, such that the data packets are addressed to a network endpoint associated with the virtual interface of the respective application layer consumer so as to cause said new stream of data packets to be delivered into the receive queue of the respective application layer consumer.

2. A network interface device as claimed in claim 1, wherein the hardware accelerator is configured to not forward said one or more streams of data packets received from the network.

3. A network interface device as claimed in claim 1, wherein each new stream of data packets for an application layer consumer is formed in accordance with a predetermined network protocol.

4. A network interface device as claimed in claim 1, wherein each new stream of data packets for an application layer consumer is formed in accordance with the same network protocol in accordance with which received streams of data packets comprising application layer messages for the new stream are formed.

5. A network interface device as claimed in claim 1, wherein the hardware accelerator is further configured to, on parsing each stream of data packets received from the network, identify control messages intended for all recipients of application layer messages of that received data stream and include those control messages in each of the new streams of data packets directed to application layer consumers that are recipients of application layer messages from that received data stream.

6. A network interface device as claimed in claim 5, wherein at least one of the streams of data packets received from the network is a financial data feed from an electronic exchange and the control messages in that data stream intended for all recipients of application layer messages of that received data stream are control messages relating to the operation of the electronic exchange and intended for all subscribers to that financial data feed.

7. A network interface device as claimed in claim 1, wherein the hardware accelerator is further configured to, on parsing each stream of data packets received from the network, identify control messages intended for all recipients of application layer messages of that received data stream and include those control messages in a new streams of data packets directed to one or more predetermined application layer consumers of the set of application layer consumers that are recipients of application layer messages from that received data stream.

8. A network interface device as claimed in claim 1, wherein each new stream of data packets for an application layer consumer is formed in accordance with the same application layer protocols with which the received streams of data packets comprising application layer messages for the new stream are formed.

9. A network interface device as claimed in claim 1, wherein the hardware accelerator is configured to do one of the following on receiving application layer messages that do not have any of the characteristics associated with the application layer consumers and are not control messages intended for all recipients of application layer messages from the received data streams:
discard those application layer messages;
deliver those application layer messages in a data stream to one or more predetermined application layer consumers; or
deliver each of those application layer messages in a data stream to an application layer consumer selected by means of a hash performed over one or more characteristics of that application layer message.

10. A network interface device as claimed in claim 1, wherein the hardware accelerator is configured to, on receiving a stream of data packets that includes redundant forward error correction information, use the forward error correction information to attempt to recover any missing data packets and discard the forward error correction information prior to parsing the stream of data packets.

11. A network interface device as claimed in claim 1, wherein the hardware accelerator is configured to discard duplicate application layer messages in a received stream of data packets.

12. A network interface device as claimed in claim 1, wherein the hardware accelerator is configured to, for a given application layer consumer, convert application layer messages identified in the received data streams for that application layer consumer into a predefined data format prior to inclusion of the identified application layer messages in the corresponding new data stream.

13. A network interface device as claimed in claim 1, wherein the hardware accelerator is configured to, prior to inclusion of the identified application layer messages in a new data stream, process at least some of the identified application layer messages by performing one or more of:
conversion of predefined data representations in the identified application layer messages into host endian natural representations;
conversion of predefined numeric values in the identified application layer messages into a binary numeric format;
decompression of the identified application layer messages; and
discarding unwanted fields from the identified application layer messages.

14. A network interface device as claimed in claim 1, wherein the hardware accelerator is configured to deliver data packets of a new data stream into its corresponding receive queue according to a reliable delivery mechanism.

15. A network interface device as claimed in claim 1, wherein each application layer consumer is configured to identify to the hardware accelerator at least some of the set of characteristics to be associated with that application layer consumer.

16. A network interface device as claimed in claim 1, wherein the hardware accelerator or network interface device further comprises a data store holding for each of the application layer consumers the set of characteristics associated with that application layer consumer.

17. A network interface device as claimed in claim 16, further comprising a software interface configured to, in response to an appropriately formatted request from a application layer consumer that includes a representation of a set of characteristics identifying application layer messages required by that application layer consumer, cause that set of characteristics to be stored at the data store and associated with the application layer consumer.

18. A network interface device as claimed in claim 17, wherein the software interface is configured to write the set of characteristics to the data store by means of a driver of the network interface device.

19. A network interface device as claimed in claim 17, wherein the software interface is an application programming interface.

20. A network interface device as claimed in claim 1, wherein the hardware accelerator is configured to update the sets of characteristics stored at the data store in respect of each application layer consumer in dependence on information received in application layer messages from the network.

21. A network interface device as claimed in claim 1, wherein the hardware accelerator is configured to identify in application layer messages having one or more of a set of characteristics associated with an application layer consumer associations between one or more characteristics of the current set and a new characteristic not currently associated with that application layer consumer, the hardware accelerator being configured to store said new characteristic at the data store and associate the new characteristic with the application layer consumer.

22. A network interface device as claimed in claim 21, wherein at least one of the application layer consumers is a financial application layer consumer configured to process application layer messages relating to financial securities.

23. A network interface device as claimed in claim 22, wherein the financial application layer consumer is configured to identify a set of characteristics to the hardware accelerator that includes one or more of: security symbol, order ID, an identifier of the financial exchange at which the application layer message originates, and a price or other financial parameter of a security or a market.

24. A network interface device as claimed in claim 22, wherein the new characteristic is an order ID not yet known to the respective application layer consumer and the one or more characteristics of the current set is a security symbol.

25. A network interface device as claimed in claim 1, wherein the network interface device is coupled to the processing subsystem by means of a data bus.

26. A network interface device as claimed in claim 1, wherein the network interface device is configured to write directly into the receive queues of the application layer consumers by means of direct memory access.

27. A network interface device as claimed in claim 1, wherein the hardware accelerator is a reconfigurable logic device.

28. A method for distributing application layer messages to application layer consumers, the method comprising:
  receiving a request, from a plurality of application layer consumers, for application layer messages from one or more streams of data packets received at the hardware accelerator by indicating to the hardware accelerator a respective set of characteristics identifying those application layer messages; and
  on receiving the one or more streams of data packets from a network, the hardware accelerator parsing the streams of data packets and:
    identifying application layer messages within the received data packets and extracting those application layer messages having one or more of the respective set of characteristics requested by a respective application layer consumer;
    duplicating the application layer messages that have one or more of the respective set of characteristics associated with more than one application layer consumer so as to provide those application layer messages to each of those application layer consumers; and
    framing the identified application layer messages in a new stream of data packets for each application layer consumer, by encapsulating the identified application layer messages with headers identifying each respective application layer consumer into data packets, such that the data packets are addressed to a network endpoint associated with a virtual interface of the respective application layer consumer provided at the network interface device so as to cause said new stream of data packets to be delivered into the receive queue of the respective application layer consumer.

29. A data processing system comprising:
  a processing subsystem supporting a plurality of application layer consumers, each application layer consumer being arranged to process application layer messages matching a respective set of characteristics requested by that application layer consumer received into a respective receive queue associated with that application layer consumer;
  a network interface device supporting a virtual interface for each of the receive queues and comprising a hardware accelerator, said hardware accelerator configured to parse one or more streams of data packets received from a network so as to:
    identify application layer financial data messages within the data packets and extract those application layer messages having one or more of the respective set of financial characteristics requested by a respective application layer consumer;
    duplicate the application layer financial messages that have one or more of the respective set of financial characteristics associated with more than one application layer consumer so as to provide those application layer messages to each of those application layer consumers; and
    frame the identified application layer messages in a new stream of data packets for each application layer consumer, by encapsulating the identified application layer messages with headers identifying each respective application layer consumer into data packets, such that the data packets are addressed to a network endpoint associated with the virtual interface of the respective application layer consumer so as to cause said new stream of data packets to be delivered into the receive queue of the respective application layer consumer.

30. A network interface device comprising:
  circuitry configured to support a virtual interface for each of a plurality of receive queues, each receive queue being associated with a respective application layer consumer supported by a processing subsystem;
  a hardware accelerator configured to parse one or more streams of data packets received from a network so as to:
    identify application layer financial data messages within the data packets and extract those application layer messages having one or more of a respective set of financial characteristics requested by a respective application layer consumer;
    duplicate the application layer financial messages that have one or more of the respective set of financial characteristics associated with more than one application layer consumer so as to provide those application layer messages to each of those application layer consumers; and
    frame the identified application layer messages in a new stream of data packets for each application layer consumers, by encapsulating the identified application layer messages with headers identifying each respective application layer consumer into data packets, such that the data packets are addressed to a network endpoint associated with the virtual interface of the respective application layer consumer so as to cause said new stream of data packets to be delivered into the receive queue of the respective application layer consumer.

* * * * *